United States Patent
Schwartz et al.

(10) Patent No.: US 9,911,565 B2
(45) Date of Patent: Mar. 6, 2018

(54) SEALED MODULAR POWER DISTRIBUTION APPARATUS

(71) Applicant: LITTELFUSE, INC., Chicago, IL (US)

(72) Inventors: Geoffrey Schwartz, Stockton, MA (US); Justin Kaufman, Chicago, IL (US); Dana Scribner, Tyngsboro, MA (US); Matt McWhinney, Chicago, IL (US)

( * ) Notice: Subject to any disclaimer, the term of this patent is extended or adjusted under 35 U.S.C. 154(b) by 0 days.

(21) Appl. No.: 14/872,325

(22) Filed: Oct. 1, 2015

(65) Prior Publication Data
US 2017/0098523 A1 Apr. 6, 2017

(51) Int. Cl.
*H01R 9/00* (2006.01)
*H02B 1/04* (2006.01)
*H01H 85/20* (2006.01)

(52) U.S. Cl.
CPC ... *H01H 85/2045* (2013.01); *H01H 2223/002* (2013.01)

(58) Field of Classification Search
USPC .................................. 361/807, 809, 810, 822
See application file for complete search history.

(56) References Cited

U.S. PATENT DOCUMENTS

| | | | |
|---|---|---|---|
| 4,781,600 A * | 11/1988 | Sugiyama | H01R 9/2466 29/830 |
| 5,777,843 A | 7/1998 | Younce | |
| 6,015,302 A | 1/2000 | Butts et al. | |
| 6,027,360 A * | 2/2000 | Jenkins | H01R 13/6215 439/248 |
| 6,431,880 B1 | 8/2002 | Davis et al. | |
| 6,869,292 B2 * | 3/2005 | Johnescu | H01R 13/506 439/74 |
| 7,396,262 B2 | 7/2008 | Korczynski et al. | |
| 7,429,176 B2 * | 9/2008 | Johnescu | H01R 13/506 439/74 |
| 7,649,731 B2 * | 1/2010 | Parrish | B60R 16/0238 174/254 |
| 8,119,892 B2 | 2/2012 | Leach et al. | |
| 2008/0057758 A1 * | 3/2008 | Walter | H01R 13/518 439/108 |

OTHER PUBLICATIONS

ISR and Written Opinion mailed in corresponding international patent application No. PCT/US2016/047710.

* cited by examiner

*Primary Examiner* — Hung S Bui

(57) ABSTRACT

Provided are approaches for modularized power distribution. In one approach, an apparatus may include a module extending into an interior cavity of a housing assembly through an opening formed in a base section of the housing assembly. The module may include a component grid at one end for receiving one or more components (e.g., fuses, relays, circuit breakers, diodes, etc.), and a wiring alignment cover at an opposite end operable with a terminal. The apparatus may further include a mechanical sealing element disposed along one or more surfaces of the module to provide a seal between the module and the base section defining the opening. In another approach, a plurality of modules may be disposed within a plurality of openings formed in the base section. In another approach, the apparatus may include a bracket configured to releasably connect the base section and the cover.

20 Claims, 6 Drawing Sheets

SEALED MODULAR POWER DISTRIBUTION APPARATUS

FIELD OF THE DISCLOSURE

The disclosure relates generally to a power distribution assembly and, more particularly, to a sealed modular fuse box system.

BACKGROUND OF THE DISCLOSURE

Components such as fuses, relays, diodes, and the like, are used in automobiles to provide a connection between the battery and various components, such as the starter, generator, and so forth. Fuses may be provided in a fuse assembly that may be connected to the automobile battery. The fuses may be individually inserted frictionally into a pair of projections, which are provided by a terminal. The terminal is held fixed by upper and lower press-fit layers. An upper housing of a housing assembly defines apertures, wherein the projections extend into the apertures so that an operator may place a fuse into the pair of projections. However, power distribution assemblies including multiple components and multi-part housings are expensive to manufacture and assemble, and lack scalable customization to meet the needs of smaller applications.

SUMMARY

In view of the foregoing, it would be advantageous to provide a sealed modular power distribution apparatus that allows greater flexibility to meet the needs of smaller applications that may not have the volume to justify customizing an entire fuse box. Additionally, it would be advantageous to provide interchangeable modules that are sealed to a housing assembly and configured to receive terminals through openings formed through a base wall of the housing assembly to directly connect the terminals to one or more components (e.g., fuses, relays, circuit breakers, diodes, etc.) within the housing assembly.

One exemplary approach in accordance with the present disclosure may include an apparatus having a module extending into an interior cavity of a housing assembly through an opening formed in a base section of the housing assembly, the module including a component grid. The apparatus may further include a mechanical sealing element disposed along a surface of the module to provide a seal between the module and the base section defining the opening.

Another exemplary approach in accordance with the present disclosure may include a modular power distribution apparatus having a housing assembly including a base section coupled to a cover, and a set of modules extending into an interior cavity of the housing assembly through one or more openings formed in the base section. Each of the set of modules may include a component grid disposed at a first end. The modular power distribution apparatus may further include a mechanical sealing element disposed along one or more sidewalls of each of the set of modules to provide a seal between each of the set of modules and the base section defining each of the one or more openings.

Another exemplary approach in accordance with the present disclosure may include a modular power system having a housing assembly including a base section and a cover. The base section may include a base wall including a plurality of openings, and an inner wall extending substantially perpendicularly from the base wall, wherein the inner wall is releasably coupled to the cover. The modular power system may further include a plurality of modules extending into an interior cavity of the housing assembly through the plurality of openings of the base wall. Each of the set of modules may include a component grid disposed at a first end, and a mechanical sealing element disposed along one or more sidewalls of each of the set of modules, the mechanical sealing element in contact with the base wall.

Figure 1:
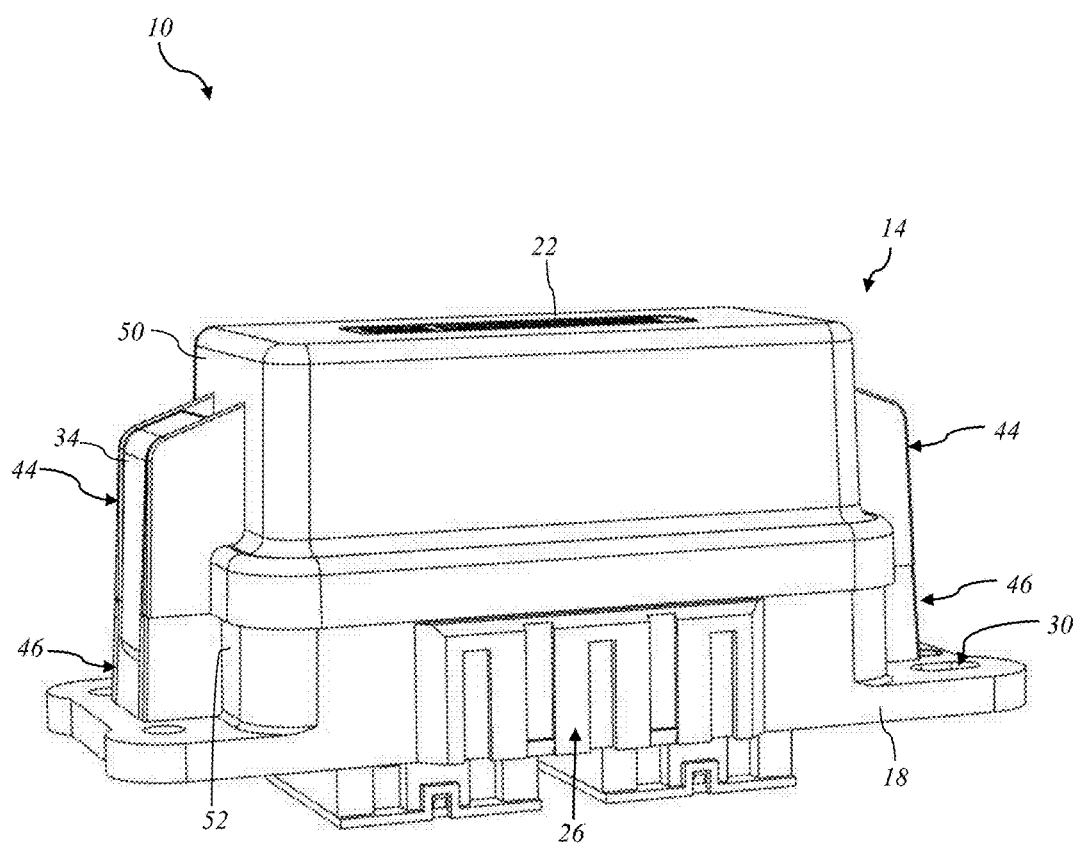
FIG. 1 is an isometric view illustrating an apparatus according to exemplary embodiments.

The drawings are not necessarily to scale. The drawings are merely representations, not intended to portray specific parameters of the disclosure. The drawings are intended to depict typical embodiments of the disclosure, and therefore should not be considered as limiting in scope. In the drawings, like numbering represents like elements.

Furthermore, certain elements in some of the figures may be omitted, or illustrated not-to-scale, for illustrative clarity. Cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DETAILED DESCRIPTION

An apparatus, a modular power distribution apparatus, and a modular power system in accordance with the present disclosure will now be described more fully hereinafter with reference to the accompanying drawings, in which embodiments of the system and method are shown. The apparatus, modular power distribution apparatus, and modular power system, however, may be embodied in many different forms and should not be construed as being limited to the embodiments set forth herein. Rather, these embodiments are provided so that this disclosure will be thorough and complete, and will fully convey the scope of the system and method to those skilled in the art.

For the sake of convenience and clarity, terms such as "top," "bottom," "upper," "lower," "vertical," "horizontal," "lateral," and "longitudinal" will be used herein to describe the relative placement and orientation of these components and their constituent parts, each with respect to the geometry and orientation of a sensor apparatus and/or housing assembly as they appear in FIGS. 1-5. Said terminology will include the words specifically mentioned, derivatives thereof, and words of similar import.

As used herein, an element or operation recited in the singular and proceeded with the word "a" or "an" should be understood as not excluding plural elements or operations, unless such exclusion is explicitly recited. Furthermore, references to "one embodiment" of the present disclosure are not intended to be interpreted as excluding the existence of additional embodiments that also incorporate the recited features.

As stated above, approaches herein provide for customized power distribution using a sealed modular apparatus. In one approach, an apparatus may include a module extending into an interior cavity of a housing assembly through an opening formed in a base section of the housing assembly. The module may include a component grid at one end for receiving one or more components (e.g., fuses, relays, circuit breakers, diodes, etc.), and a wiring alignment cover at an opposite end operable with a terminal. The apparatus may further include a mechanical sealing element disposed along one or more surfaces of the module to provide a seal between the module and the base section defining the opening. In another approach, a plurality of modules may be disposed within a plurality of openings formed in the base section. In another approach, the apparatus may include a bracket configured to releasably connect the base section and the cover.

Figure 2:
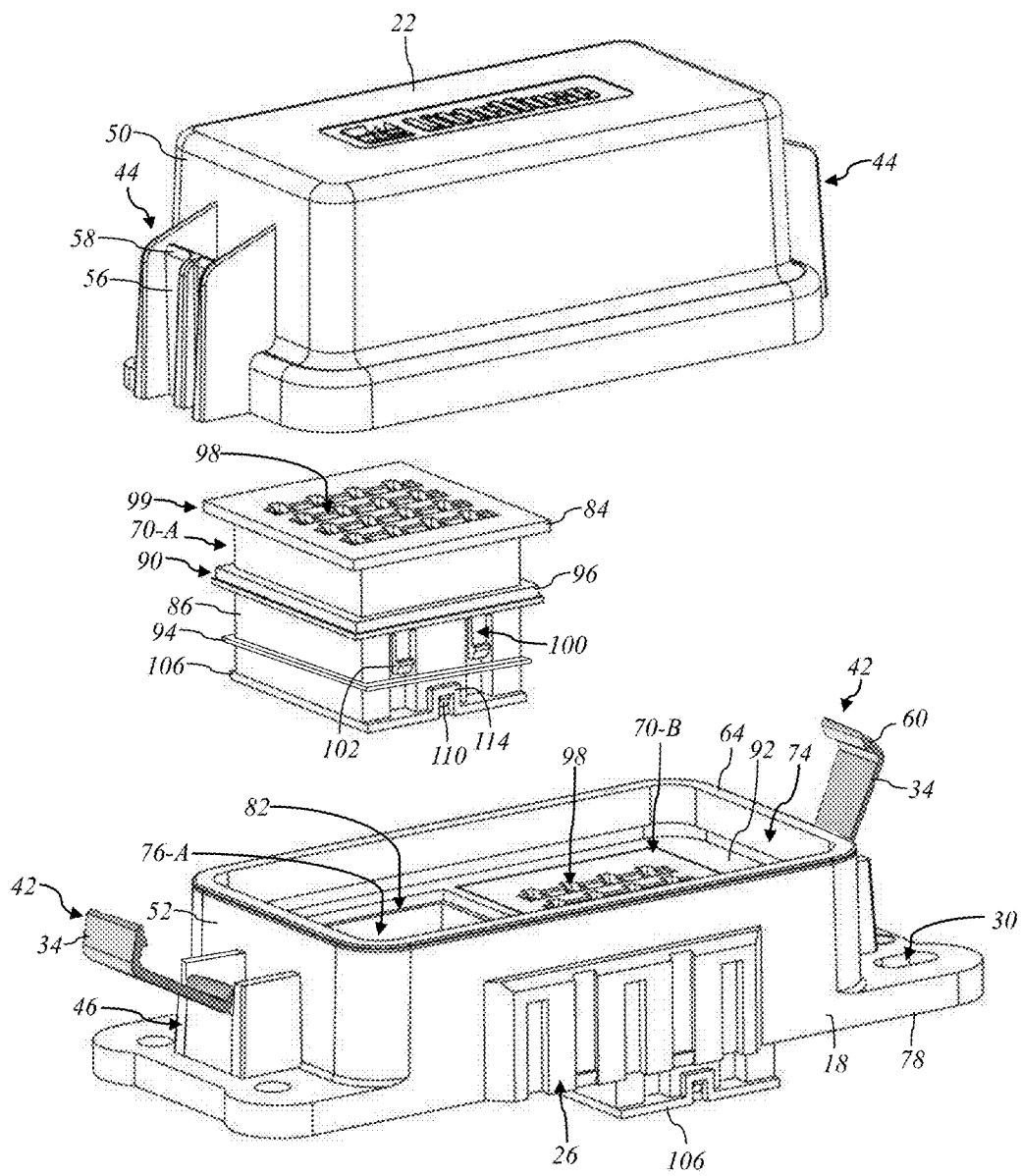
FIG. 2 is an exploded isometric view of the apparatus shown in FIG. 1 according to exemplary embodiments.
Figure 3:
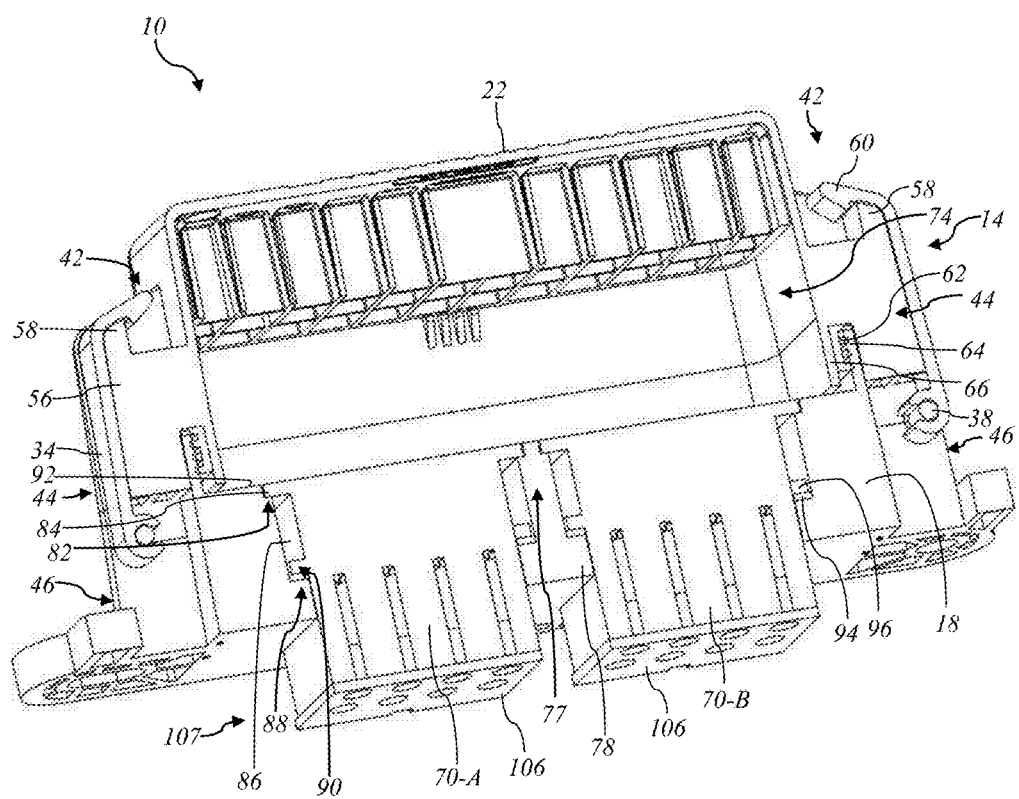
FIG. 3 is a cutaway view of the assembly shown in FIG. 1 according to exemplary embodiments.

Referring to FIGS. 1-3, an exemplary embodiment of a modular power distribution apparatus/system (hereinafter, apparatus 10) in accordance with the present disclosure is shown. The exemplary apparatus 10 includes a housing assembly 14 having a base section 18 coupled to a cover 22, the cover 22 removably connected to the base section 18 and covering the circuit protection components therein. The cover 22 can be removed, for example, to replace an opened fuse or to inspect the power distribution grid. The cover 22 includes a seal that prevents dust, moisture and other contaminants from reaching the circuit protection devices.

In one embodiment, the cover 22 can snap-fit to the base section 18 and/or include one or more latching mechanisms to secure the cover to the housing releasably, as will be further described herein. In an alternative embodiment, the cover 22 is threaded onto the base section 18 and can include a spring seal that provides a tensile force against the cover 22, which tends to hold the cover in a tight, threaded relationship with the housing even when the vehicle is moving and creating vibrations that could otherwise loosen the cover 22. The spring mechanism can also provide a seal between the cover 22 and the base section 18. Although not specifically illustrated, the cover 22 may also include means to further facilitate grasping and removal, such as tabs, projections, recesses, etc.

The base section 18 may include a set of interlocking features 26 for mounting multiple housing assemblies together, as well as one or more mounting apertures 30. In some embodiments, the housing assembly 14 may be made of an insulating material, such as plastic, which is molded to form a demonstrated shape. In some embodiments, the base section 18 and the cover 22 can be made of the same or different materials, such as an insulating plastic, e.g., nylon, glass-filled nylon, polyester and polycarbonate.

As shown, the apparatus 10 further includes one or more brackets 34 coupled to a pin 38 (FIG. 3) of the base section 18, wherein the brackets 34 are configured to releasably connect the base section 18 to the cover 22. In one embodiment, the brackets 34 pivot about an axis defined by the pin 38 to move a top section 42 of each bracket 34 towards/away from the cover 22. When the cover is not in use, for example as shown in FIG. 2, the brackets 34 may rotate and extend away from the cover 22. Then, as the cover 22 is positioned onto the base section 18, a first set of support structures 44 of the cover 22 are positioned atop and generally align with a second set of support structures 46 of the base section 18. The first set of support structures 44 and the second set of support structures 46 extend perpendicularly from an end wall surface 50 of the cover 22 and an end wall surface 52 of the base section 18, respectively. Furthermore, as shown, a cross-brace 56 extends between the first set of support structures 44 of the cover 22 and includes a tab 58 configured to engage a protrusion 60 of the top section 42 of each bracket 34 to secure the cover 22 to the base section 18.

As further shown in FIG. 3, the apparatus 10 may further include a sealing strip 62 positioned between the cover 22 and the base section 18 to provide a seal therebetween. In one embodiment, the sealing strip 62 is an elastomer configured as a plurality of ridges and groves to provide a mechanical seal between an upper rim 64 of the base section 18 and a lower shoulder 66 of the cover 22.

Figure 4A:
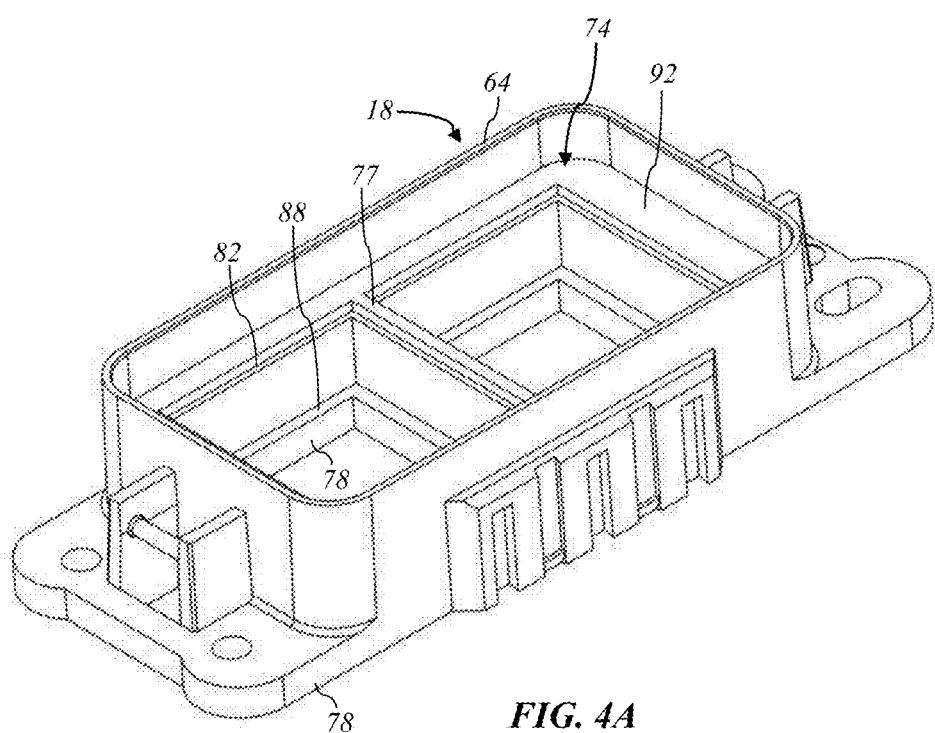
FIG. 4A is an isometric view of a base section of the apparatus shown in FIG. 1 according to exemplary embodiments.
Figure 4B:
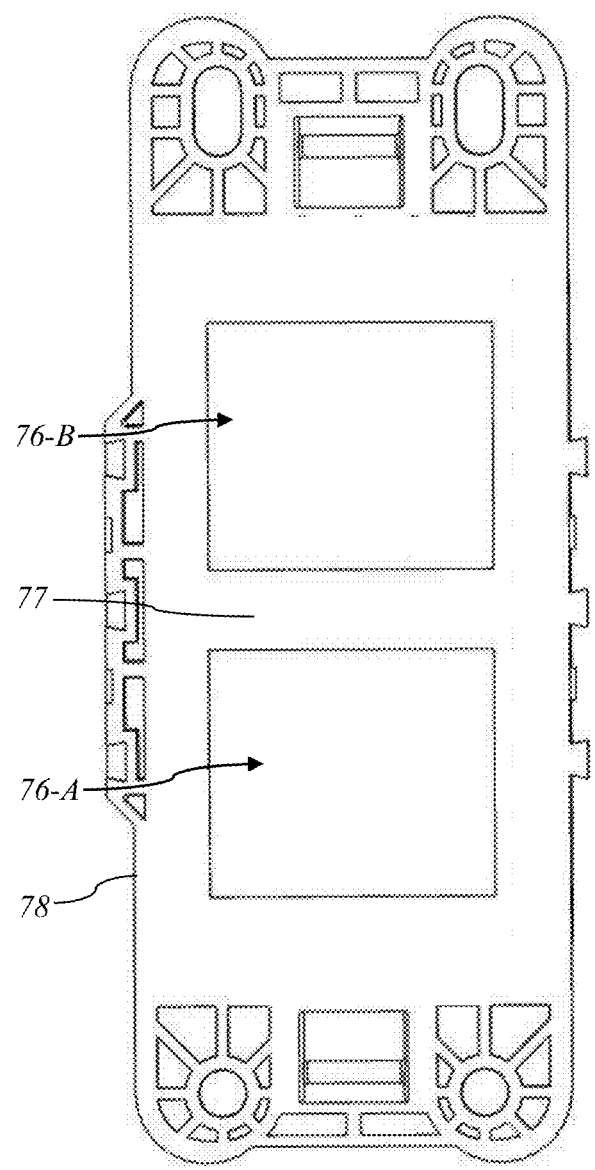
FIG. 4B is a bottom view of the base section shown in FIG. 4A according to exemplary embodiments.

Referring now to FIGS. 2-4, a set of interchangeable modules operable with the housing assembly 14 will be described in greater detail. Unlike a unitary one-piece monolithic insulative housing assembly and power distribution block, the apparatus 10 of the present disclosure includes one or more modules 70A-B, which provide customizable electrical connections. The modules 70A-B allow a snap-together assembly with the base section 18 of the housing assembly 14 to accommodate different bussed or non-bussed configurations and, therefore, provide a wide variety of pole variations for a specific application. It will be appreciated that although FIGS. 2-4 demonstrate a pair of modules 70A-B extending through a corresponding pair of openings, the apparatus 10 is scalable, and therefore may accommodate a greater number of modules and openings in other embodiments.

In one embodiment, the apparatus 10 includes one or more modules 70A-B extending into an interior cavity 74 of the housing assembly 14 though one or more corresponding openings 76A-B formed in the base section 18 of the housing assembly 14. As shown, the base section 18 includes a base wall 78 having openings 76A-B formed therein, the openings 76A-B configured to receive the modules 70A-B. The openings 76A-B may be separated by a framing element 77 and include a first ledge 82 for engaging a flange 84 that extends laterally from a sidewall 86 of each module 70A-B. Each of the openings 76A-B may further define a second ledge 88 for engaging a mechanical sealing element 90 disposed along one or more sidewalls of the modules 70A-B. As shown, when positioned within the openings 76A-B, the first ledge 82 is in abutment with the flange 84, the second ledge 88 is in abutment with the mechanical sealing element 90, and the modules 70A-B are substantially planar with a surface 92 within the interior cavity 74.

Figure 5A:
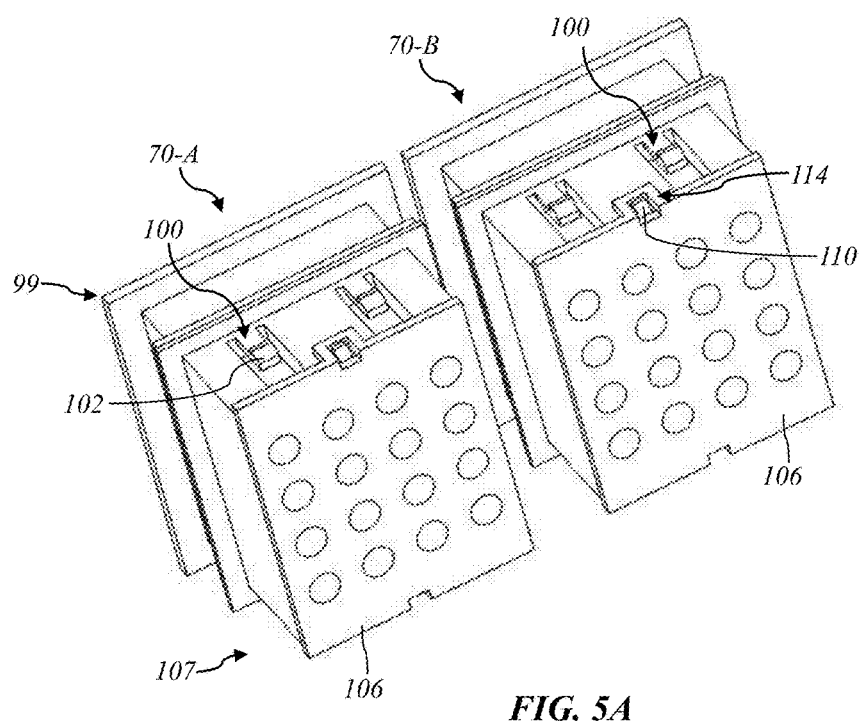
FIG. 5A is an isometric view of a set of modules of the apparatus shown in FIG. 1 according to exemplary embodiments.

Referring now to FIGS. 3-5, the modules 70A-B will be described in greater detail. As shown, each module 70A-B includes the mechanical sealing element 90 disposed along the sidewall 86 to provide a seal between the modules 70A-B and the base section 18 defining respective openings 76A-B. In one embodiment, the mechanical sealing element 90 includes a gasket 94 (e.g., an elastomer) in contact with a ridge 96, wherein the gasket 94 and the ridge 96 extend perpendicularly from each side of the modules 70A-B to form a perimeter around each of the modules 70A-B. As shown, the gasket 94 is positioned between the ridge 96 and the second ledge 88 of each opening 76A-B to form a seal therebetween.

In exemplary embodiments, as more clearly demonstrated in FIG. 2, each the modules 70A-B includes a component grid 98 disposed at a first end 99 thereof. As shown, the component grid 98 may be coupled to each module 70A-B and positioned within the openings 76A-B such that the component grid 98 is exposed to the interior cavity 74 of the base section 18 and is substantially planar with the surface 92. In exemplary embodiments, the component grid 98 may include a matrix of apertures that form a plurality of footprints for a plurality of components, such as fuses or circuit protection devices (overcurrent or overvoltage), that are plugged into the component grid 98 of the apparatus 10.

The apertures in the component grid 98 can form a plurality of the same types of fuses. Alternatively, the apertures form different footprints for different types of component footprints. In one embodiment, the apertures of the component grid 98 form footprints for a plurality of male blade type fuses, such as MINI® fuses. In another embodiment, the apertures may form footprints for female cartridge fuses (e.g., JCASE™ fuses provided by the assignee of the present disclosure) or larger type fuses (e.g., ATO® fuses or MAXI® fuses, both provided by the assignee of the present disclosure). Components may be micro-relays, while other components may be ISO/power relays. The apparatus 10 is accordingly not limited to fuse operation.

The fuses and other components are illustrated for automotive uses, such as for cars, trucks, motorcycles, boats, wave-runners, all-terrain vehicles and other types of sports vehicles or others listed above. However, the teachings of the present disclosure and the benefits and advantages of the apparatus 10 are not limited to vehicle type applications.

In various embodiments, the modules 70A-B may be bussed and/or unbussed. For example, one or more of the modules 70A-B may operate without a bussing element (e.g., a bus bar). The elimination of internal bussing may allow greater circuitry customization using direct wire-to-component connections. In one embodiment, unbussed modules may accommodate one or more of the following component configurations: (8) MINI®; (6) ATO®; (3) MAXI®; (4) JCASE™; (1) ISO form C MINI® relay and (2) ATO®; (1) ISO power relay; (2) ISO micro form A and (2) ATO®, (2) MAXI® and (2) ATO®; (2) Delphi® Metri-Pack 280 series form C relays and (2) Delphi® Metri-Pack 280 series form A terminals; and (4) Delphi® Metri-Pack 280 series form A terminals and (4) MINI®.

In other embodiments, one or more of the modules 70A-B include a bussing element, such as a bus bar, connected thereto. For example, bussed modules may accommodate one or more of the following component configurations: (8) MINI®; 6 ATO®; (4) JCASE™; (1) ISO power relay form A and (1) MAXI®; (2) ISO MINI® form C and (2) ATO®; (1) ISO power relay form A and (2) JCASE™; (2) Delphi® Metri-Pack 280 series form C terminals and (2) series form A terminals; and (4) Delphi® Metri-Pack 280 series form A terminals and (4) MINI®. The bus bar may be made of any suitable electrically conductive material, for example, a material capable of carrying relatively high currents. One such suitable material is C1100 alloy, which is 99.9% pure copper with ½ hard temper. In another embodiment, the bus bar includes one or more heat sinks.

As shown in FIGS. 2 and 5, to secure the modules 70A-B within the openings 76A-B, each of the modules 70A-B includes one or more module fasteners 100 that releasably connect to corresponding elements (not shown) along the interior of the openings 76A-B. In one embodiment, each module fastener 100 may be a snap-fit connector having a retaining projection 102 that is received in a sidewall aperture of the openings 76A-B. In one embodiment, the snap-fit connector includes one or more tongues extending beneath leading edges of adjacent sections and received in complementary slots (not shown) inside grooves of mating sections along the sidewalls of openings 76A-B so that the mating ends of adjacent sections slightly overlap one another and form a secure, structurally stable fit with one another. In one embodiment, the module fasteners 100 provide a secure resistance fit that facilitates assembly and disassembly of the modules 70A-B by hand and without employing tools.

Figure 5B:
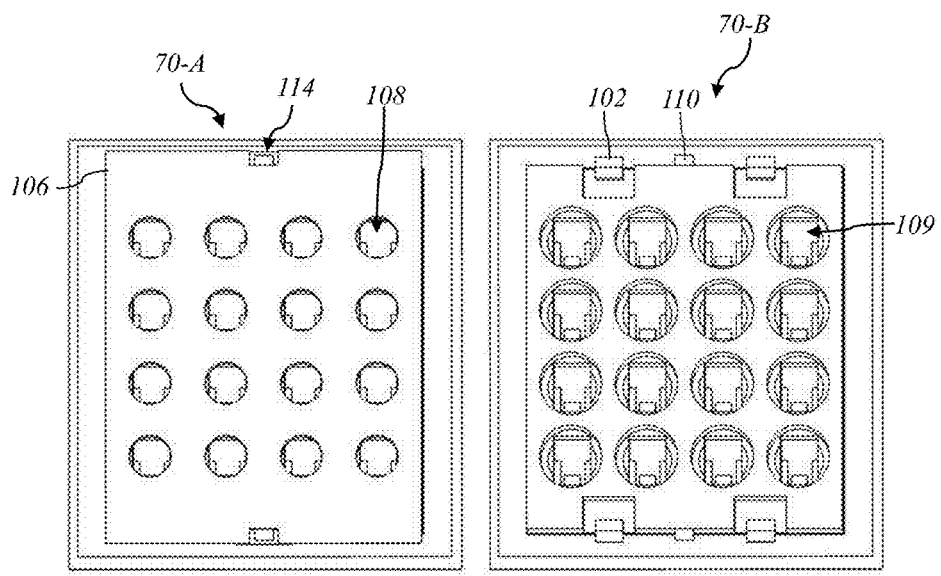
FIG. 5B is a bottom view of the set of modules of the apparatus shown in FIG. 5A according to exemplary embodiments.

Referring again to FIGS. 2, 3, and 5, a wiring alignment cover attached to each module 70A-B will be described in greater detail. As shown, each of the modules 70A-B is coupled with a wiring alignment cover 106 at a second end 107 thereof, the wiring alignment cover 106 disposed external to the base section 18. In exemplary embodiments, the wiring alignment cover 106 may be a terminal position assurance lock (TPA), which provides secondary locking protection of wire leads (not shown) inserted through a plurality of openings 108 therein, which are substantially aligned with a plurality of openings 109 (FIG. 5B) in the modules 70A-B. Module 70B of FIG. 5B is shown without the wiring alignment cover 106 for the sake of explanation.

The wiring alignment cover 106 may snap onto the bottom of the modules 70A-B after wires are installed, and do not interfere with any cable seals. As shown, the wiring alignment cover 106 is secured to each of the modules 70A-B via one or more alignment cover fasteners 110 disposed along a sidewall of the modules 70A-B, wherein the alignment cover fasteners 110 are configured to releasably connect the wiring alignment cover 106 and each of the modules 70A-B. In one embodiment, each alignment cover fastener 110 is a snap-fit connector having a retaining projection that is received in an aperture 114.

Although not shown, a plurality of terminals may be coupled to the modules 70A-B at the second end 107, so that the terminals extend through the modules 70A-B via the plurality of openings 76A-B and directly connect to the components of the component grid 98 through the base wall 78 of the base section 18. Alternatively, the modules 70A-B may additionally receive any combination of cable seals and/or cavity plugs in addition to the terminals. In one embodiment, the terminals may include a male blade-type fuse (e.g., a MINI® fuse), which includes a pair of blade terminals, each of which press fits into one of the fuse mounting terminals. For each fuse, one of the terminals may connect to a trace that extends to a load within the vehicle. Other terminals may connects electrically to a trace that extends to a common electrical connection.

In an exemplary embodiment, the modules 70A-N are operable with terminals utilizing internationally standardized male blade sizes, allowing for flexibility in design. For example, blade sizes may range from 1.5 mm to 8 mm with current capability ranging from 14 to 60 amps. The terminals may be designed to be compatible with processing techniques such as automated pull-to-seat and push-to-seat assembly, dual-stage crimping, load cell crimp inspection and automated part identification and orientation. The terminals may be sealed to reduce exposure to extreme temperatures, chemicals, and abrasion.

In some embodiments, the terminals may be mounting terminals (e.g., having a tuning fork like configuration) that may or may not be soldered (e.g., wave soldered) to a printed circuit board (PCB). In an alternative embodiment, the terminals are surface-mounted to the PCB. In such case, the terminals do not extend through the PCB.

The PCB provides the circuit routing between the fuses and terminal connections. The PCB includes traces that run from the fuse mounting terminals to the connector terminals, stud connectors, etc. The PCB may be made of FR-4 material but can alternatively be ceramic if a more rigid material is needed. The PCB can be single or multilayered and is customized as desired by the customer. The PCB can provide a wider trace that serves as a buss bar or common connection for the fuse mounting terminals and connector terminals.

The PCB can also hold other types of circuit protection, such as overvoltage protection in the form of medal oxide varistors ("MOVs"), diodes, and thyristors. The overvoltage protection devices can be used for example to protect low operating voltage or signal level devices placed in the automobile. The overvoltage protection devices can be mounted on a same side of the PCB as the fuses or be located on the opposite or bottom side of the PCB.

In view of the foregoing, at least the following advantages are achieved by the embodiments disclosed herein. It is an advantage to enable customization through modularity of the various power distribution modules. Whether using non-feed-through terminals, feed-through terminals, screw cover, snap-on cover, bolt-on cover, screw base, snap-on base, bolt-on base, the modules have the same mounting footprint so that customers can switch out modules without changing the mounting configuration. It is another advantage of the present disclosure to provide a modular power distribution apparatus for vehicles, which is relatively easy to manufacture and install. It is still another advantage of the present disclosure to provide a power distribution module for vehicles, which provides relatively high component and circuit density. It is yet another advantage of the present disclosure to provide a power distribution module for vehicles, which has a feed-through configuration that further increases the amount of components and/or circuitry allowable in a same footprint capacity. It is still a further advantage of the present disclosure to provide a ready way to manufacture different module housings via a same mold. Further still, it is an advantage of the present disclosure to provide a modular power distribution apparatus having a standardized mounting hole pattern so that customers can interchange modules without reconfiguring the customer's mounting apparatus. Moreover, it is an advantage of the present disclosure to provide power distribution modules that are sealed effectively from the outside to prevent contaminants from reaching the interior of the housing assembly.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

The invention claimed is:

1. An apparatus, comprising:
   a module extending into an interior cavity of a housing assembly through an opening of a plurality of openings formed in a base section of the housing assembly, the module including a component grid; and
   a mechanical sealing element disposed along a surface of the module to provide a seal between the module and the base section defining the opening, wherein the plurality of openings are separated by a framing element extending across the interior cavity.

2. The apparatus of claim 1, further comprising a bracket coupled to the base section, the bracket releasably connecting the base section and a cover of the housing assembly.

3. The apparatus of claim 1, further comprising a wiring alignment cover coupled to the module.

4. The apparatus of claim 3, wherein the wiring alignment cover is disposed external to the base section.

5. The apparatus of claim 3, the module including an alignment cover fastener releasably connecting the wiring alignment cover to the module.

6. The apparatus of claim 1, the module including a module fastener releasably connecting the base section and the module.

7. The apparatus of claim 1, the mechanical sealing element comprising a gasket in abutment with a ridge, the ridge extending from the surface of the module.

8. The apparatus of claim 1, further comprising a ledge of the base section in abutment with the mechanical sealing element.

9. The apparatus of claim 1, further comprising a plurality of modules extending into the interior cavity of the base section through the plurality of openings formed in a base wall of the base section.

10. A modular power distribution apparatus, comprising:
    a housing assembly including a base section coupled to a cover;
    a set of modules extending into an interior cavity of the housing assembly through a plurality of openings formed in the base section, each of the set of modules including a component grid disposed at a first end; and
    a mechanical sealing element disposed along one or more sidewalls of each of the set of modules to provide a seal between each of the set of modules and the base section defining the plurality of openings, wherein the plurality of openings are separated from one another by a framing element extending across the interior cavity.

11. The modular power distribution apparatus of claim 10, further comprising a bracket rotatably coupled to a pin of the base section, the bracket releasably connecting the base section and the cover.

12. The modular power distribution apparatus of claim 10, further comprising a wiring alignment cover coupled to a second end of one or more of the set of modules.

13. The modular power distribution apparatus of claim 12, wherein the wiring alignment cover is positioned external to the base section.

14. The modular power distribution apparatus of claim 12, further comprising an alignment cover fastener disposed along the one or more sidewalls of each of the set of modules to releasably connect the wiring alignment cover to the second end of each of the set of modules.

15. The modular power distribution apparatus of claim 10, further comprising a module fastener disposed along the one or more sidewalls of each of the set of modules to releasably connect the base section to each of the set of modules.

16. The modular power distribution apparatus of claim 10, the mechanical sealing element including a ridge lined by a gasket, the ridge extending substantially perpendicularly from the one or more sidewalls of each of the set of modules.

17. The modular power distribution apparatus of claim 10, the plurality of openings each defining a ledge of the base section in abutment with the mechanical sealing element.

18. A modular power system, comprising:
    a housing assembly including a base section and a cover, the base section comprising:
       a base wall including a plurality of openings; and an inner wall extending substantially perpendicularly from the base wall, wherein the inner wall is releasably coupled to the cover; and a plurality of modules extending into an interior cavity of the housing assembly through the plurality of openings in the base wall, each of the plurality of modules including:

a component grid disposed at a first end; and a mechanical sealing element disposed along one or more sidewalls of each of the plurality of modules, the mechanical sealing element in contact with the base wall.

19. The modular power system of claim 18, further comprising a wiring alignment cover coupled to a second end of each of the plurality of modules, wherein the wiring alignment cover is positioned external to the base section.

20. The modular power system of claim 19, further comprising an alignment cover fastener configured to releasably connect the wiring alignment cover to each of the plurality of modules, and a module fastener configured to releasably connect the base section and each of the plurality of modules.

* * * * *